United States Patent
Singh et al.

(10) Patent No.: US 9,106,593 B2
(45) Date of Patent: Aug. 11, 2015

(54) MULTICAST FLOW REORDERING SCHEME

(71) Applicant: CISCO TECHNOLOGY, INC., San Jose, CA (US)

(72) Inventors: Amit Singh, Fremont, CA (US); Deepak S. Mayya, Fremont, CA (US); Narendra J. Gathoo, San Jose, CA (US); Ranga Rajagopalan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 170 days.

(21) Appl. No.: 13/915,698

(22) Filed: Jun. 12, 2013

(65) Prior Publication Data

US 2014/0369351 A1    Dec. 18, 2014

(51) Int. Cl.
| | |
|---|---|
| H04L 12/28 | (2006.01) |
| H04L 12/861 | (2013.01) |
| H04L 12/18 | (2006.01) |
| H04L 12/939 | (2013.01) |
| H04L 12/931 | (2013.01) |

(52) U.S. Cl.
CPC ............ *H04L 49/9057* (2013.01); *H04L 12/18* (2013.01); *H04L 49/552* (2013.01); *H04L 49/201* (2013.01)

(58) Field of Classification Search
None
See application file for complete search history.

(56) References Cited

U.S. PATENT DOCUMENTS

| | | | |
|---|---|---|---|
| 6,434,118 B1* | 8/2002 | Kirschenbaum | 370/236.1 |
| 6,661,773 B1 | 12/2003 | Pelissier et al. | |
| 6,714,553 B1* | 3/2004 | Poole et al. | 370/412 |
| 7,586,909 B1* | 9/2009 | Walrand et al. | 370/388 |
| 7,782,885 B1* | 8/2010 | Sabato et al. | 370/412 |
| 2003/0039209 A1* | 2/2003 | Webber | 370/217 |
| 2004/0143593 A1 | 7/2004 | Le Maut et al. | |
| 2007/0183418 A1* | 8/2007 | Riddoch et al. | 370/389 |

OTHER PUBLICATIONS

PCT Oct. 1, 2014 International Search Report and Written Opinion of the International Searching Authority from International Applicatio Serial No. PCT/US2014/040930; 8 pages.

* cited by examiner

*Primary Examiner* — Duc C Ho
(74) *Attorney, Agent, or Firm* — Patent Capital Group

(57) ABSTRACT

An example system and method for multicast flow reordering in a network is provided and includes receiving a data packet at an egress of a node, the data packet associated with a descriptor including at least one parameter; determining the at least one parameter of the descriptor; and processing the data packet for reordering based on the determining of the at least on parameter of the descriptor.

20 Claims, 16 Drawing Sheets

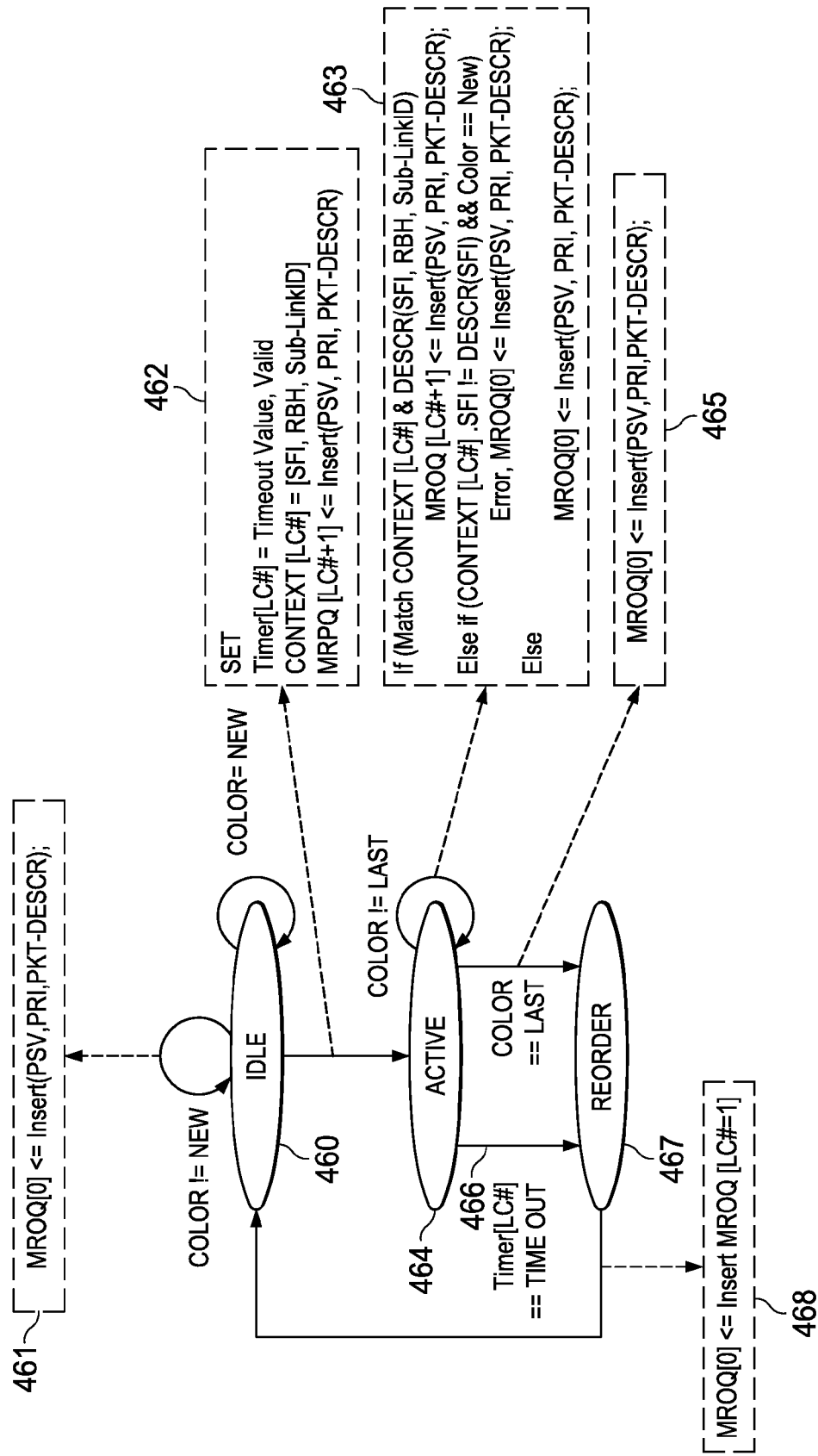

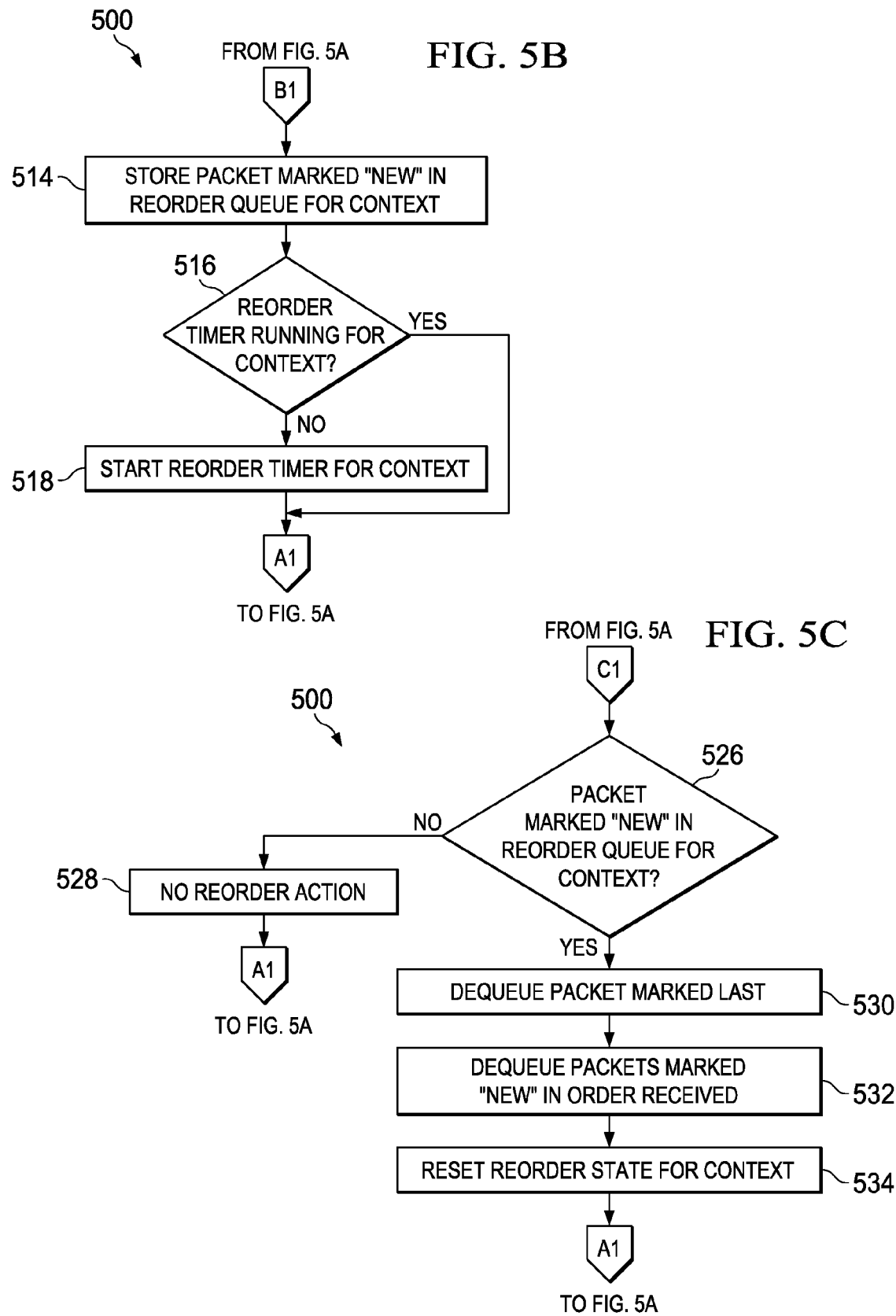

MULTICAST FLOW REORDERING SCHEME

TECHNICAL FIELD

This disclosure relates in general to communication networks and, more particularly, to a system and a method for multicast data traffic flow reordering in a communication network.

BACKGROUND

Communication networks generally function to move data from a source to a destination through a network of nodes interconnected by point-to-point links. The links may be bi-directional communication paths between two interconnected nodes within the network. Data may be transmitted in packets and routed through intermediate nodes (e.g., routers and switches between a source and a destination in the network). Routing protocols implemented within the nodes of a network allow one or more components, devices, or modules of the node to correctly direct data to its appropriate next destination. The transmission of data from a source to a destination in a network may be part of a point-to-point communication in which the source is directing the transmission at a single destination. The transmission of data to a source may also be part of a multicast transmission in which the source is directing the transmission to multiple destinations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4C is a simplified diagram showing an example reorder state machine in accordance with an embodiment of the disclosure;

FIGS. 5A through 5F are simplified flow diagrams illustrating example operations that may be associated with an egress section of a system in accordance with an embodiment of the disclosure;

DETAILED DESCRIPTION OF EXAMPLE EMBODIMENTS

Overview

An example method for multicast data traffic flow reordering is provided and includes receiving a data packet at an egress (e.g., an interface) of a node, the data packet associated with a descriptor including at least one parameter. The descriptor can be associated with any symbol, text, color field, identifier, label, proprietary information, etc.: all of which may be provided in any suitable location of the packet (e.g., in a designated field, in a header, as part of the encapsulation, as part of a proprietary protocol, as part of a payload, etc.). The descriptor can be linked (e.g., related, tied, correlated, or otherwise associated) with the parameter, which can be associated with any relevant information for that packet, a condition in the network, a status, a context, link characteristics, etc. For example, the descriptor may provide information about the context of the data packet, for example, source IO-slice, hash bin information and a sublink ID.

The method can also include determining (e.g., identifying, evaluating, looking-up, etc.) the at least one parameter of the descriptor and processing (e.g., routing, ordering, queuing, dequeuing, organizing, storing, etc.) the data packet for reordering based on the determining of the at least on parameter of the descriptor.

An example system may be applied when dynamic load balancing has been used to reassign the multicast flow to a new path through the node. The system and method further can include configuring information associated with the data packets of the reassigned multicast flow at the ingress of the node, sending the associated information and the data packets to the egress, and, reordering the data packets of the reassigned multicast flow at the egress based on the associated information. The system and method can provide reordering of received data packets of the same multicast flow that may be transmit on either of a formerly assigned path or on a newly assigned path through a node.

Example Embodiments

Figure 1:
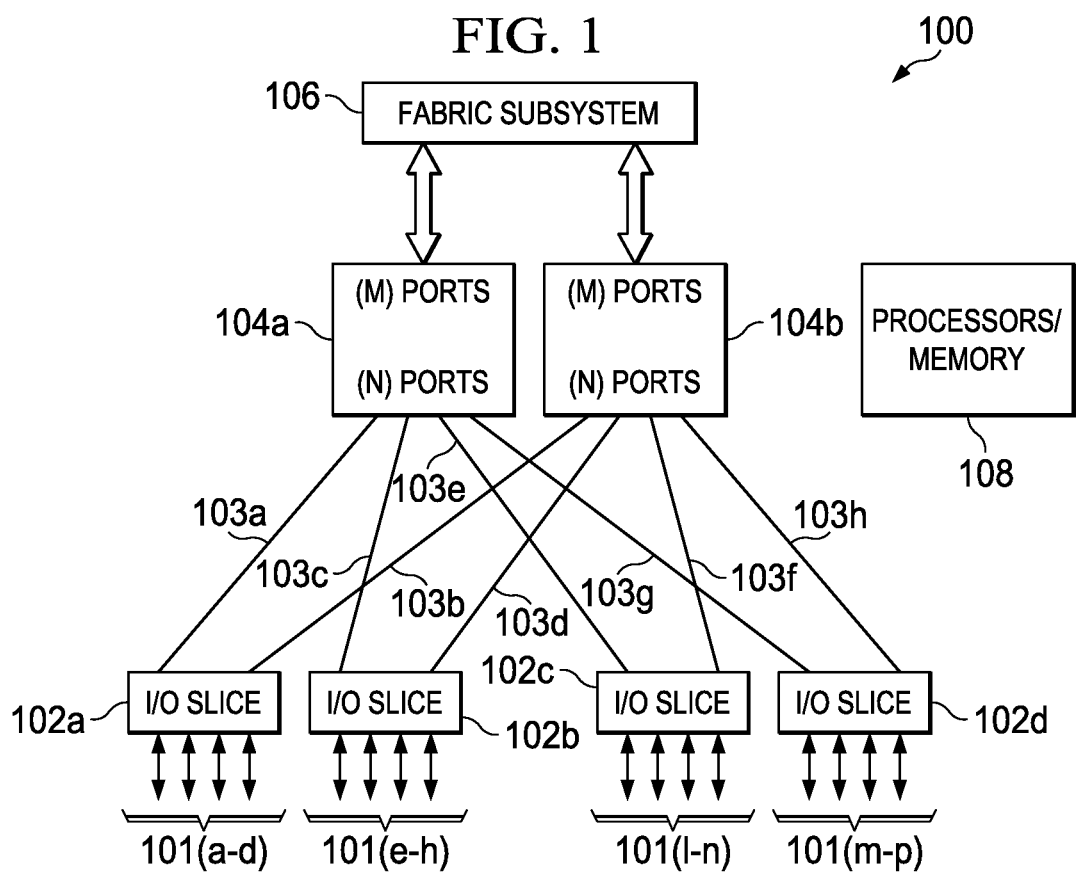
FIG. 1 is a simplified block diagram illustrating an example system into which an embodiment of the disclosure may be implemented.

Referring now to FIG. 1, FIG. 1 is a simplified block diagram illustrating an example system 100 into which an embodiment of the disclosure may be implemented. System 100 includes input/output (I/O) slices 102(a)-102(d), switches 104(a) and 104(b), fabric subsystem 106, and processors/memory 108. System 100 may be implemented as a node in a telecommunications network and function as a switch/router to receive and direct data traffic to and from other network nodes and devices to implement data transmission in the network. Switch 100 may be any type of router, switch, or system that handles data traffic. In accordance with one example embodiment, for example, a switch such as Cisco® Nexus 7000 or MDS 9000 may be used to implement system 100.

Data traffic is received and transmitted at I/O slices 102(a)-102(d) from and to a network on I/O ports 101(a-p). When data transmit from a network source to a network destination is received at one of I/O slices 102(a)-102(b) it is sent to one of switches 104(a) or 104(b) on one of a plurality of links connecting each of the I/O slices 102(a)-102(b) to each switch 104(a) and 104(b). In an example embodiment, each of the connections 103(a)-103(h) may each comprise two links that couple one of the I/O slices 102(a)-102(b) with one of the switches 104(a) and 104(b), and the N ports on each of the switches 104(a) and 104(b) may comprise 8 ports. For example, in FIG. 1, I/O slice 102(a) may have two links to 104(a) through connection 103(a) and two links to 104(b) through connection 103(b). The data is passed from the switch 104(a) or 104(b) onto the fabric subsystem 106 and is routed appropriately for its destination through the fabric subsystem on appropriate links and then back though one of the switches 104(a) or 104(b) through the appropriate I/O slice of 102(a)-102(d) and I/O ports represented by I/O ports 101(a-p) on the route to its network destination. While FIG. 1 shows example numbers of system components and connections for the I/O ports, switches, fabric subsystem, and I/O slices, alternative embodiments of the disclosure may be implemented in systems using any appropriate combination of different components, with varying numbers of the system components and, with varying configurations and numbers of connections between the components.

Processors/memory 108 may be used to implement the embodiments of the system and method of multicast flow reordering of the disclosure. In an example implementation, there may be a processors/memory unit 108 implemented in each of the I/O slices 102(a-d) that controls the ingress and egress multicast reordering functions for each I/O slice according to the embodiments of the disclosure. Alternatively, the functions of one or more of processors/memory unit 108 may be shared by the I/O slices 204(a-d). Processors/memory 108 may be implemented in any appropriate hardware and software combination, and may comprise, for example, programmed processors, or application specific integrated circuits (ASICs) configured to perform the reordering process.

Note that in order to better understand some of the capabilities and teachings of the present disclosure, the following foundational information is provided. Such information is offered earnestly and in no way should limit the scope of the present disclosure.

Multicast traffic in a multicast transmission is implemented so that data packets are routed through a network to multiple destinations using resources and bandwidth as efficiently as possible. This is done by transmitting single packets meant for multiple destinations on a single path through the network as far as possible and replicating the packet for transmission on multiple paths to the multiple destinations when the network topology designates use of the multiple paths to reach the multiple destinations. As the multicast packets traverse the network, the network nodes replicate the packet only when necessary to pass it on to the multiple destinations.

A network node typically has input (ingress) ports and output (egress) ports and switching circuitry for switching packet traffic received on the ingress ports to the appropriate egress ports of the node. Multicast traffic within a node may be replicated in the switch fabric of the node. For multicast traffic (including unicast floods), nodes replicate a data packet as necessary at the divergence points inside the node, so that the multicast data packets can be replicated efficiently without having to burden any particular path with multiple copies of the same packet. The switch fabric of a node has the capability to replicate multicast packets to downlink egress ports. The switch fabric allows the replicated multicast data packets to go only to the downlink paths that need them, without sending all multicast traffic to every packet processor in the switch fabric. Each multicast traffic flow in the switch fabric can be configured as to which output packet processor and egress port a packet is to be replicated. An output queue (OA) mechanism handles the queuing of the multicast data packets to appropriate egress ports of the node. Multicast traffic may be transmitted as lossy un-arbitrated multicast data traffic. In un-arbitrated multicast data traffic, some data packet loss is considered tolerable and sequence numbers are not used to reorder the packets, as compared to point-to-point data traffic applications.

Existing multicast load balancing is implemented by sorting the various multicast flows using deep inspection of packets and binning them based on certain flow characteristic fields within the packets. This method uses IP addresses, port numbers, etc., among other fields to mathematically compute a set of hash functions to determine a unique random bin ID for each of the flows. The bin IDs are then statically assigned a fixed path through the fabric. Assuming the flow pattern is sufficiently random, the multicast flows are spread across multiple paths through the fabric achieving an even distribution of fabric load balancing. Because the paths through the fabric are statically assigned based on flow characteristics rather than flow volume, there is no guarantee that the path assignments will achieve desired load balance and hence there is a need to have corrections based on flow volume done on the path chosen for a flow through the fabric. This correction needs to be deployed to account for changes to the flow volume. This makes the load-balancing dynamic compared to the original scheme of statically carving out random paths through the fabric based on flow characteristics.

Dynamic load balancing is a method used within nodes of a network to balance multiple data traffic flows that are transmitted through the switching fabric of the node from the ingress ports to the egress ports on multiple sublinks. The multiple sublinks define various paths the data traffic flows take through the switching fabric. Dynamic load balancing reassigns the sublinks to which one or more of the data traffic flows are assigned in an attempt to balance the traffic load through the switching fabric. For example, the dynamic load balancing may reassign a particular data traffic flow from a congested sublink to a less congested sublink. This may remove bottlenecks and transmission delays for that particular traffic flow and the other traffic flows on the congested sublink and improve throughput.

Dynamic load balancing may be applied to multicast data transmission in a node. However, dynamic load balancing applied to multicast data transmission may present ordering problems in the reception of multicast data packets at the egress of the node. If a multicast traffic flow is reassigned from a former sublink to a new sublink, the data packets of the multicast flow that were transmit on the formerly assigned sublink and the data packets of the same multicast traffic flow that are transmit on the newly assigned sublink may arrive at the egress out of order. For example, data packets of the multicast data traffic flow that are transmit on the newly assigned sublink may arrive at the egress before one or more data packets that are transmit on a formerly assigned sublink.

Lossy multi-destination un-arbitrated multicast data traffic arriving out of order at the egress of a node could cause particular problems since the data packets do not carry sequence numbers that could be used for reordering the packets. Adding sequence numbers for use in reordering un-arbitrated multicast data traffic in the node would add overhead, and be complex to design and implement. It would provide an advantage therefore to have a system and method for multicast flow reordering in a network node that was simple to implement, was efficient, and that offered low overhead in terms of requiring node resources for implementation.

In an example embodiment, data packets of a multicast flow are marked at the ingress with information that may be used in reordering and sent through the node to the egress. A data packet may be marked with an indication that the data packet is "last," "new," or "in-order." The marking may be done, for example, by setting a color field in a descriptor of the packet header to a status or color marking of "last," "new," or "in-order." When a multicast flow is reassigned to a new path through the node defined by a new sublink, the last data packet sent to the egress on the sublink to which the multicast flow was formerly assigned may be marked "last." Subsequent data packets of the multicast flow sent on the new sublink may be marked "new" until predetermined criteria are satisfied. After the predetermined criteria are satisfied subsequent data packets of the multicast flow sent on the new sublink may be marked "in-order." The egress of the node may configure and manage a reorder queue for the reassigned data flow based on an appropriate context and the color markings of the packets received at the egress.

In another example embodiment, data packets of a multicast flow received at the ingress of a node may be assigned to one of a plurality of hash bins. Each hash bin may then be assigned to one of a plurality of sublinks, where each of the sublinks is associated with a unique path through the node. The hash bin to which a multicast flow has been assigned may be then dynamically reassigned to a new sublink based on flow volume measures made on the hash bins. Data packets of a multicast flow sent through the node may be marked with a status or color marking of "in-order," "new" or "last." The ingress may initially transmit all data packets through the node to the egress marked "in-order." The marking may be done, for example, by setting a color field in a descriptor of the packet header. The descriptor may also include information on the context of the data packet, for example, source IO-slice, hash bin information and a sublink ID. When a hash bin is reassigned to a new sublink, the last data packet of a multicast flow transmitted on the original sublink may be marked "last" and flooded to all of the multicast flow destinations in the node. The new data packets sent from the hash bin, which has now been reassigned, on the new sublink, may then be marked "new." Marking of packets with "new" may continue until satisfaction of predetermined criteria within the ingress initiates a change of the data packet markings for the multicast flow from "new" to "in-order." The data packets sent from the ingress of the multicast flow are received at the egress. When the egress receives a data packet marked "new" the context associated with the received data packet is checked. If a reorder queue does not exist for the context, a reorder queue may be installed for the context and the data packet is stored in the queue. If a reorder queue already exists for the context, the packet may be stored in the reorder queue that is assigned the context. When the egress receives a data packet marked "last" it determines whether any data packets marked "new" are stored in a reorder queue for a context of the data packet marked "last." If data packets marked "new" are stored in a reorder queue for the context, the egress may first dequeue the data packet marked "last" from the reorder queue to the egress output queue and then dequeue the packets marked "new" from the reorder queue to the egress output queue in the order in which they were received. If the egress receives a data packet marked "last" and no packets are stored in a reorder queue for a context of that packet, the egress may take no reorder action and the data packet may be sent to the egress output queue. In this case no out of order flow has occurred. When the egress receives a packet marked "in-order" and there are packets marked "new" stored in a reorder queue for a context of the data packet, the egress may check a sublink ID in the descriptor of the data packet marked "in-order." If the sublink ID is that of the new sublink of the reassigned flow and not the same as the sublink ID associated with the data packets in the reorder queue, the egress may assume the packet marked "last" for the bin reassignment was lost and dequeues the packets from the reorder queue. If the sublink ID is that of the former sublink of the reassigned flow the egress may send the packet marked "in-order" to the egress output queue.

In another example embodiment, timers may be used in the ingress or egress of the node to control multicast flow reordering. In the example embodiment, data packets of a multicast flow received at the ingress of a node may be assigned to hash bins. Each hash bin may then be assigned to one of a plurality of sublinks, where each of the sublinks is associated with a unique path through the node. The hash bin to which a multiflow is assigned may be dynamically assigned to a new sublink based on flow volume measurements made on the Hash bins. Data packets of a multicast flow sent through the node may be marked with a status or color marking of "in-order," "new" or "last." The marking may be done, for example, by setting a color field in a descriptor of the packet header. The descriptor may also include information on the context of the data packet, for example, source IO-slice, hash bin information, and sublink ID. The ingress initially transmits all data packets of a multicast flow through the node to the egress marked "in-order." When a hash bin is reassigned to a new sublink the last data packet of a multicast flow sent on the original sublink may be marked "last" and flooded to all of the multicast flow destinations in the node. An ingress reorder timer may also be started. The new data packets sent from the hash bin, which has now been reassigned, on the new sublink, may then be marked "new." Marking of packets with "new" may continue at the ingress until the ingress timer expires. Upon expiration of the ingress timer the ingress may initiate a change of the data packet markings for the multicast flow from "new" to "in-order." The data packets sent from the ingress of the multicast flow are received at the egress. When the egress receives a data packet marked "new" a context associated with the bin and sublink of the received data packet is checked. If a reorder queue does not exist for the context, a reorder queue may be initiated for the context and data packet may be stored in the queue. An egress reorder timer may also be started. If a reorder queue already exists for the context, the data packet may be stored in the reorder queue that is assigned the context. The egress continually monitors the egress reorder timer. When the egress receives a data packet marked "last" it determines whether any data packets marked "new" are stored in a reorder queue for a context of the data packet marked "last." If data packets marked "new" are stored in a reorder queue for the context, the egress may dequeue the data packet marked "last" to the egress output queue and then dequeue the data packets marked "new" from the reorder queue to the egress output queue in the order in which they were received. If the egress receives a data packet marked "last" and no packets are stored in a reorder queue for a context of that packet, the egress may take no reorder action and the data packet is sent to the egress output queue. In this case, no out of order flow has occurred. When the egress receives a packet marked "in-order" and there are packets marked "new" stored in a reorder queue for a context of the data packet, the egress checks a sublink ID in the descriptor of the data packet marked "in-order". If the sublink ID is that of the new sublink of the reassigned flow and not the same as the sublink ID associated with the data packets in the reorder queue, the egress may reset the second timer to a second egress timer value that is shorter than the initial setting of the egress reorder timer. If the sublink ID is that of the former sublink of the reassigned flow the egress may send the packet marked "in-order" to the egress output queue. At any time, when the egress reorder timer expires, from either timing out from the initial setting set on receiving the first packet marked "new" or from the reset performed when an "in-order" packet was received over the new sublink, the egress may empty the reorder queue for the context and send the data packets in the reorder queue to the output queue of the egress.

Figure 2A:
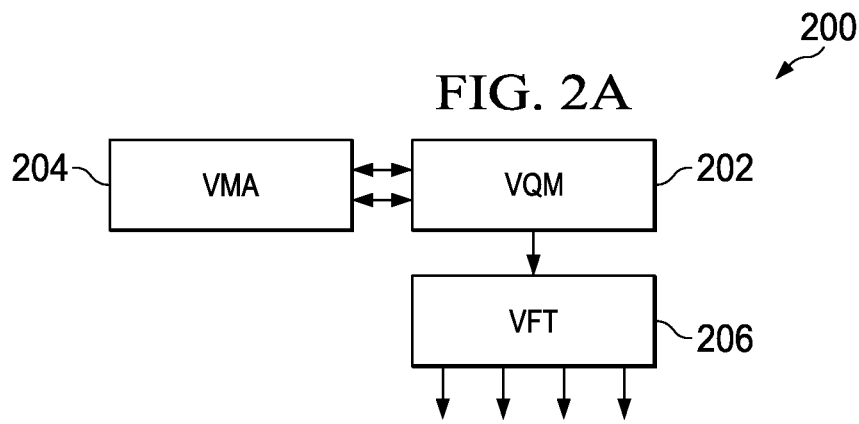
FIGS. 2A and 2B are simplified block diagrams illustrating example details of an ingress section of a system in accordance with an embodiment of the disclosure.
Figure 2B:
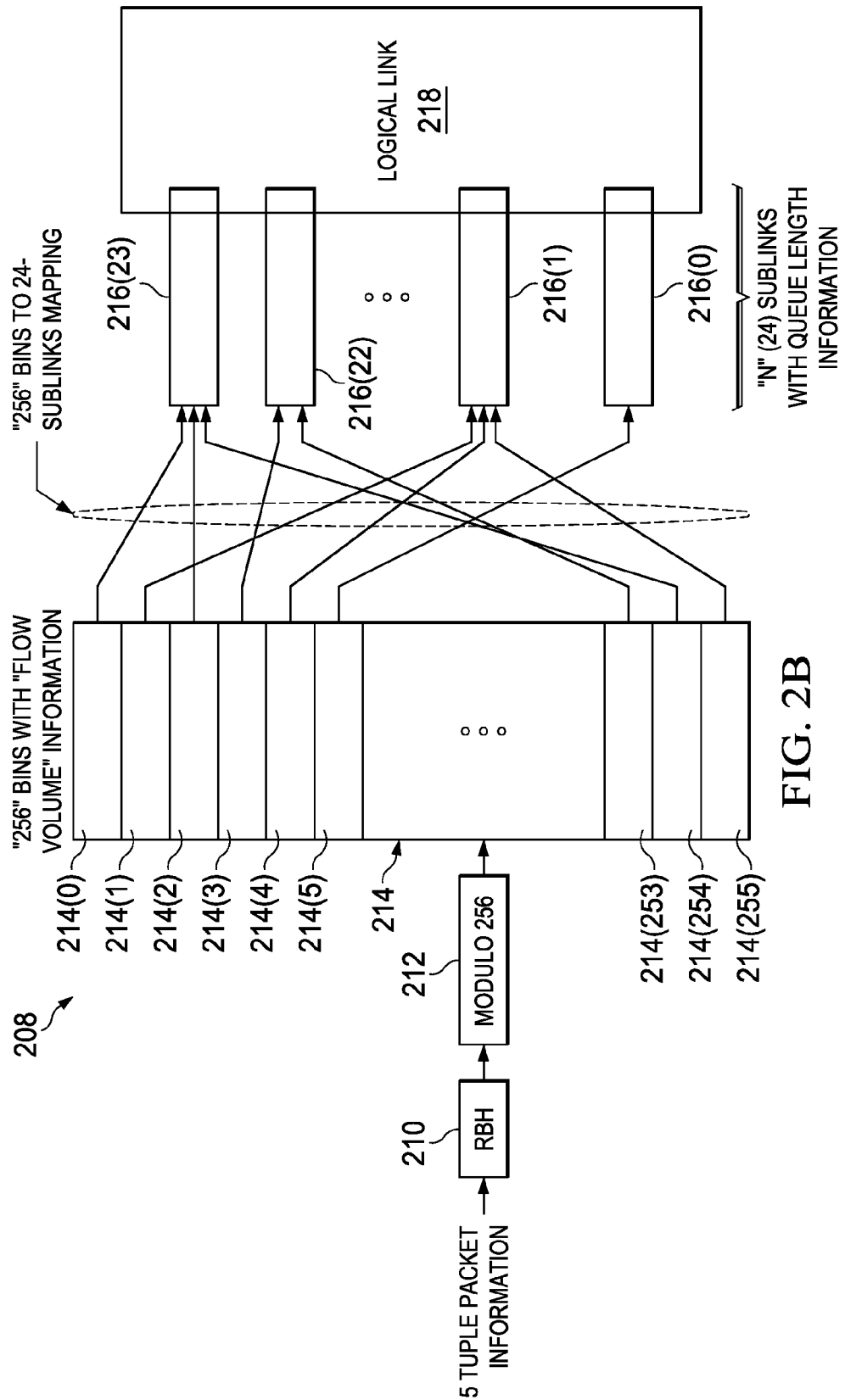

Referring now to FIGS. 2A and 2B, therein are simplified block diagrams illustrating example functions of an ingress section of a network in accordance with one embodiment of the disclosure. FIG. 2A shows ingress functional blocks that comprise a Multicast Arbiter (VMA) 204, a Queue Manager (VQM) 202, and a Fabric Transmit (VFT) 206 function of the embodiment. FIG. 2B shows a logical representation of the Result bundle hash (RBH) bin to sublink mapping function 208 of the ingress section of the embodiment. The RBH bin to sublink mapping function 208 may be implemented by the VMA block 204. VQM 202, VFT 206 and VMA 204 may be implemented in each I/O slice 102(a-d) by processor/memory 108 of FIG. 1 and may include any suitable hardware, software, components, modules, interfaces, or objects that facilitate the operations of the functions thereof. This may be inclusive of appropriate algorithms and communication protocols that allow for the effective exchange of data or information.

Referring to FIGS. 2A and 2B when multicast packet data is received at the ingress of the network 100 VMA 204 implements a multicast dynamic load balancing function by generating grants to requests from VQM multicast queues. The non-arbitrated multicast data packet takes an initial fabric route through system 100 of FIG. 1, determined at the various switching stages as based on the RBH value of the packet.

The incoming multicast traffic may be stored in multicast queues based on RBH values. For example, for each data packet, an RBH value may be derived at block 210 from a 5-tuple hash from the packet header. At block 212 the packets may then be mapped to one of the bins 214(0)-214(255) based on RBH value by modulo 256 division. The VMA 204 implements mapping of the multicast packets as represented in FIG. 2B, based on an RBH values into bins 214(0)-214(255) and onto sublinks 216(0)-216(23). Each of the bins 214(0)-214(255) may be mapped to one of plurality of links or sublinks, sublinks 216(0)-216(23), where the sublink defines a route on a path through the fabric. The multicast packets are then placed by VFT 206 on one of the four non-arbitrated traffic queues for the I/O slice determined by mapping the RBH value to a LSV/sublink value on VMA 204. VFT 206 also determines a sublink value (FBH) based on the RBH value to determine a second stage sub link path in the appropriate switch 104a, 104b. The RBH to sublink mapper in VMA 204 is consistent with RBH to sublink mapper in VFT 206.

In the embodiment of the disclosure, the ingress multicast output queues in VQM 202 which correspond to bins 214(0)-214(255) of FIG. 2B, are subject to flow volume measurements and bin reassignment to adjust traffic flow on a per RBH bin basis. A process of Dynamic Hashing with Flow Volume (DHFV) is used. The RBH bins are shuffled such that all of the sublinks have approximately equal queue lengths. The process may be repeated periodically to maintain the difference of sublink queue lengths in programmable value range. As data packets are received at the ingress, flow volume measurements are performed on the RBH bins on a per RBH label basis. Then, based on the sublink mapping, the output Queue Length per sub link 216(0)-216(23) may be maintained using rebalancing by reassigning the bin of bin 214(0)-214(255) with the maximum flow volume of the maximum length output queue to the minimum length output queue. When VMA performs RBH bin reassignment it marks one packet with the chosen RBH as "last" and all packets arriving later will be mapped using a new RBH to LSV/sublink mapper. VMA 204 also propagates the RBH to sublink change to VFT 206 with the data packet marked "last." VFT 206 updates its RBH to sublink mapper to use the new mapping for packets subsequent to the data packet marked "last." In alternative implementations any other appropriate mapping scheme and flow volume reassignment scheme maybe used to realize the embodiments of the present disclosure.

As the high volume traffic bins are reassigned, multicast traffic in the same flow but sent on the different sublinks of the originally assigned sublink and the newly assigned sublink may become out of order as received at the egress of the switch. Therefore, reordering of the multicast traffic according to the embodiments of the disclosure is performed. A time division multiplexed (TDM) time slot interval may be used to trigger the timing of multicast load balancing at the ingress. This interval may be adjustable according to feedback from the egress in order to prevent overlaps across I/O Slices on the same line card.

Figure 3:
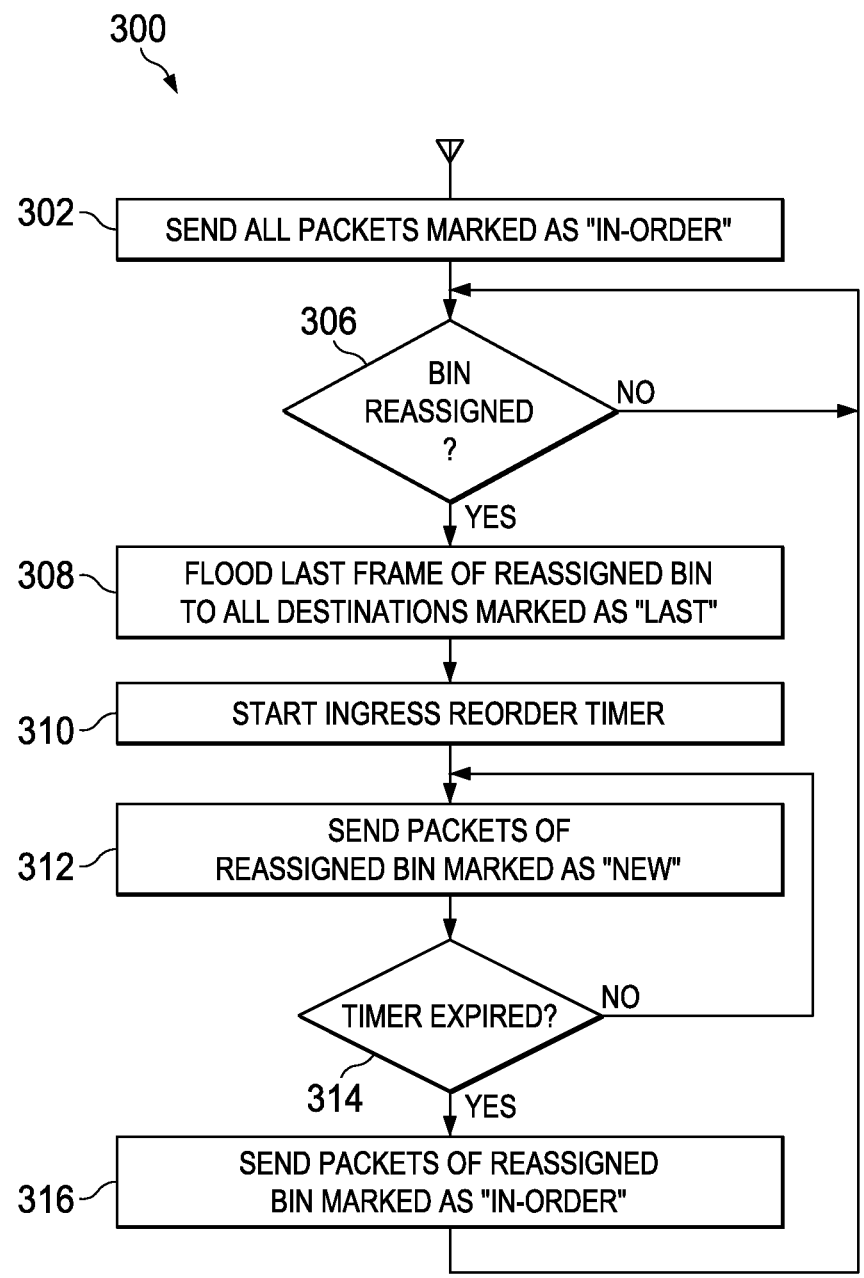
FIG. 3 is a simplified flow diagram illustrating example operations that may be associated with an ingress section of a system in accordance with an embodiment of the disclosure.

Referring now to FIG. 3, therein is a simplified flow diagram 300 illustrating example operations that may be associated with an ingress section of a network in accordance with an embodiment of the disclosure. The operations shown in FIG. 3 may be implemented into the VMA 204, VQM 202 and VFT 206 functions of FIG. 2A to provide reordering functions in the ingress of switch 100 according to the example embodiment. In the example embodiment, multicast packet headers are configured at the ingress to include status information about reassigned packet data flows and the information is used by the egress reordering function at the egress. The information may be configured as a 2-bit color field included in a descriptor in the data packet header, and may be used to mark a data packet's status in reordering as "in-order," "new," or "last."

The process begins at operation 302. At 302 the ingress initially begins sending data packets in a multicast flow assigned to a RBH bin to the egress marked "in-order." At 306 a determination is made as to whether the RBH bin has been reassigned. If the RBH bin is not reassigned the ingress continues sending data packets of the multicast flow marked as "in-order." If, at 306, it is determined that the RBH bin has been reassigned from the maximum queue length queue to the minimum queue length queue of a different sublink the process moves to 308. At 308 the ingress floods the last data packet of the reassigned bin on the original sublink to all destinations over the switch fabric marked as "last." At 310 an ingress timer is set to a predetermined time and started. In an example implementation, the ingress timer may be set for a period of 10 times the data packet round trip time through the switch fabric. At 312 data packets of a multicast flow of the reassigned bin are sent marked as "new" packets on the newly assigned sublink. At 314, if the ingress timer has not expired the process returns to 312. At 312 the ingress continues to send data packets of a multicast flow marked as "new." The data packets will continue to be marked as "new" until the ingress timer expires and the process moves from 314 to 316. At 316 packets of the reassigned bin are sent marked as "in-order" and the process moves 306 and the process repeats for if the RBH bin is reassigned to another sublink. The data packets of multicast traffic processed as such are received at the egress of switch 100.

Figure 4A:
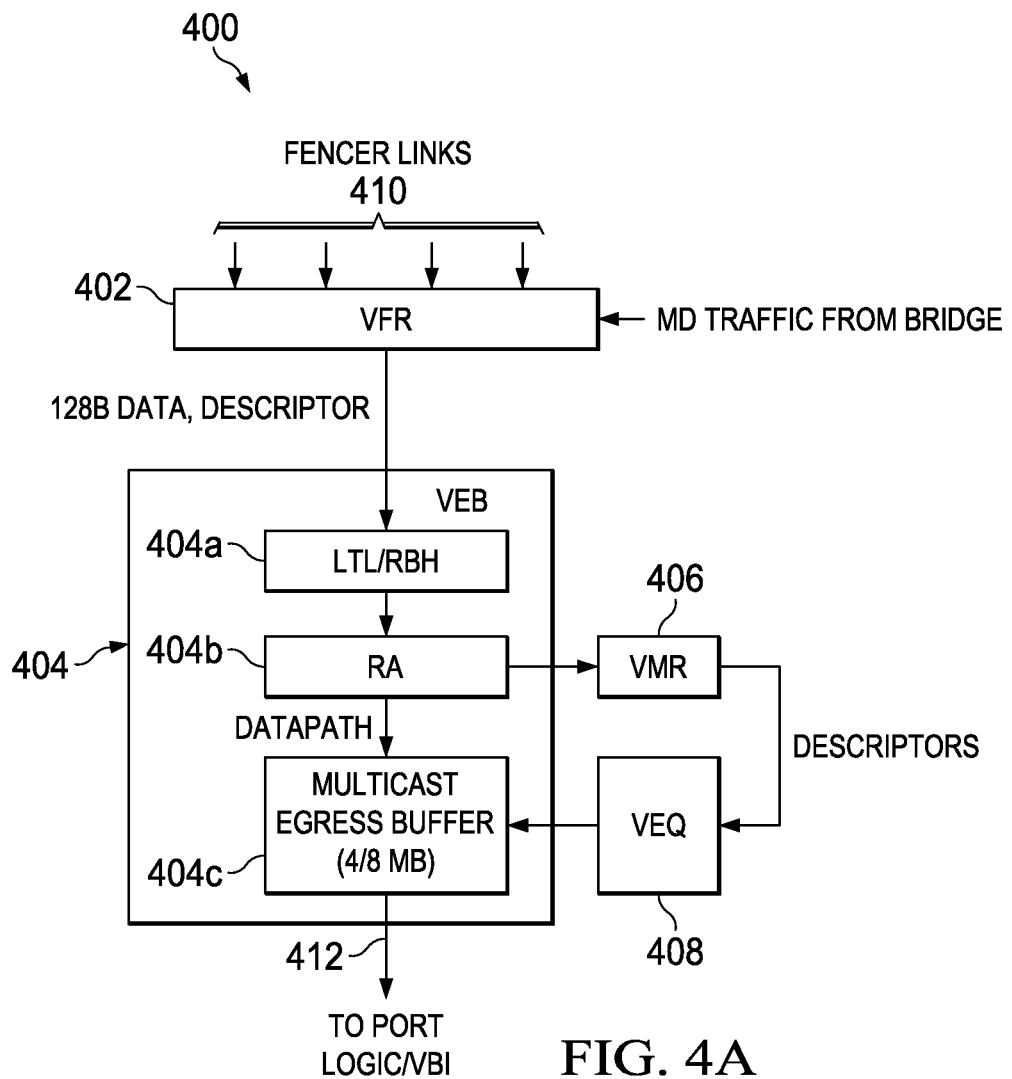
FIGS. 4A and 4B are simplified block diagrams illustrating example details of an egress section of a system in accordance with an embodiment of the disclosure.
Figure 4B:
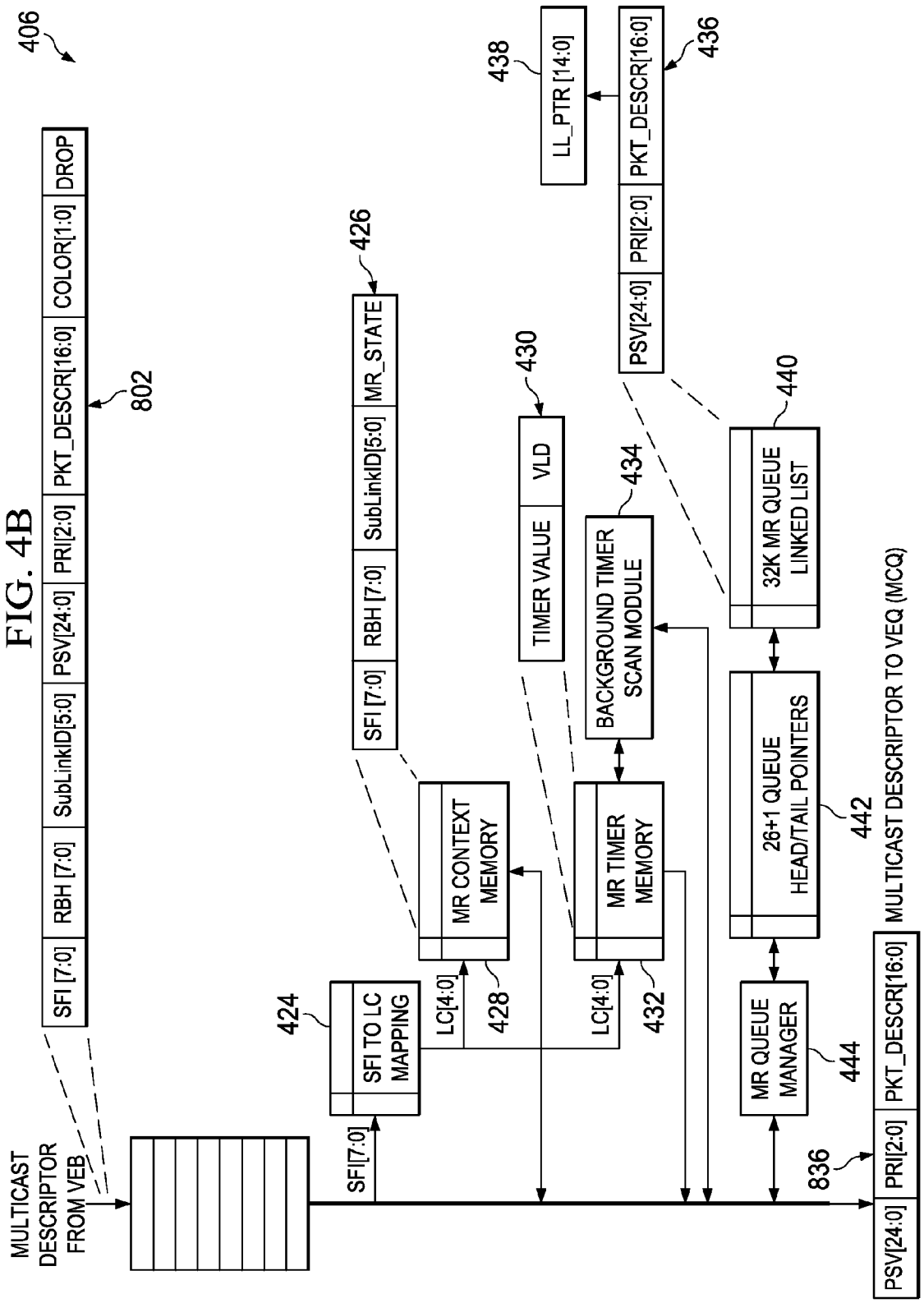

Referring now to FIGS. 4A and 4B, therein are simplified block diagrams illustrating example details of an egress section of a network in accordance with an embodiment of the disclosure. FIG. 4A shows functional blocks Virtual Fabric Receive (VFR) 402, Virtual Egress Buffer (VEB) 404, Virtual Multicast Reordering (VMR) 406, and Virtual Egress Queue (VEQ) 408. VEB 404 is shown as comprising, LTL/RBH block 404a, RA block 404b, and Multicast Egress Buffer 404c. FIG. 4B shows a simplified functional block diagram of VMR 406 of FIG. 4A. VMR 406 is shown as comprising SFI to LC Mapping Block 424, Multicast Reorder (MR) Context Memory 428, MR Timer Memory 432, Background Timer Scan Module 434, MR Queue Manager 444, Queue Head/Tail Pointers 442, and MR Queue Linked List 440. In an example embodiment, the functional blocks of FIGS. 4A and 4B may be implemented by a processor/memory 108 implemented in each I/O slice 102(*a-d*) of system 100 of FIG. 1 and may include any suitable hardware, software, components, modules, interfaces, or objects that facilitate the operations of the functions thereof. This may be inclusive of appropriate algorithms and communication protocols that allow for the effective exchange of data or information. In the example embodiment, multicast traffic is received at an I/O slice of I/O slice 102(*a-d*) on one of the appropriate links over the connections 103(*a-e*) (represented by links 410 of FIG. 4) by VFR 402. The data traffic and descriptor from the header of each the data packets of the multicast traffic is then input to VEB 404.

Figure 8:
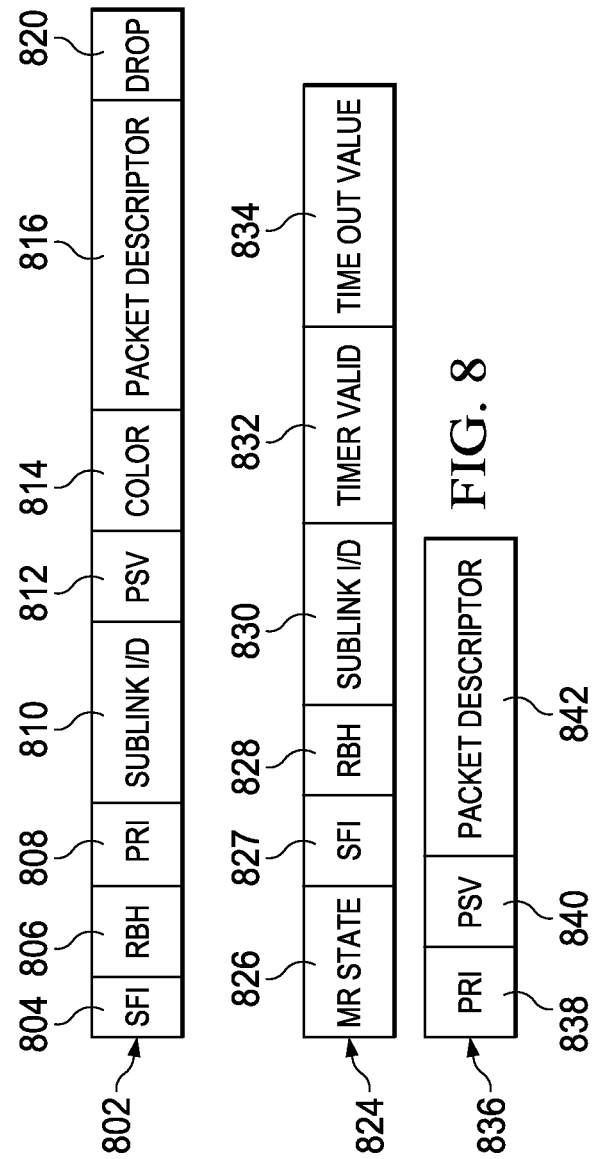
FIG. 8 is a simplified diagram illustrating example details of a data format that may be associated with an embodiment of the disclosure.

Referring now to FIG. 8, simplified diagram illustrating example details of a data format that may be associated with an embodiment of the disclosure. FIG. 8 shows the data format of a descriptor that may be received at VEB 404. The VEB descriptor 802 for each data packet includes Source Fabric Index (SFI) field 804 that indicates the unique ID allocated to a source IO-slice. The SFI field may be associated with a reorder queue and a line card value may be derived from the SFI value through a mapping table. At any given time only one multicast reorder process is allowed per line card. Descriptor 802 also includes the RBH field 806 that is extracted from the packet header, a PRI field that is used to enqueue a packet to the appropriate priority port queues, a SUBLINK ID field 810 that indicates one of the sublinks that is associated with the flow of the relevant packet, a PSV field 812 that is used by VEQ 408 to replicate descriptors if necessary across multiple ports, and the COLOR field 814. Descriptor 802 also includes a PACKET DESCRIPTOR field 816 that includes a packet pointer that corresponds to first cell of a packet and is also used as a link pointer by the VMR queue linked list, a PACKET FLAGS field that indicates the last, partial and Shared cells of a packet, a DROP field 820 that indicates if the packet should be dropped and not enqueued based on LTL/RBH 404*a* pruning results or resource accounting in RA 404*b* related to a tail drop decision (however VMR 406 still processes the descriptor for the reorder state machine even if a data packet is to be dropped). FIG. 8 also shows memory content 824 and descriptor 836. Memory content 824 shows features of multicast reorder context memory 428 and the associated reorder timer memory 432. These include the values of MR State 826, SFI 827, RBH 828, SUBLINK ID 830, TIMER VALID 832, and TIMEOUT 834 associated with a context. Descriptor 836 is a descriptor that includes the PRI 838, PSV 840, and PACKET DESCRIPTOR 842 fields and is sent from VMR 406 to VEQ 408 during the reorder process.

Referring again to FIGS. 4A and 4B, upon receiving the data traffic and descriptor 802, LTL/RBH block 404*a* performs LTL lookup, replication, and pruning based on the RBH value. RA block 404*b* performs resource accounting and passes the multicast descriptors 802 to VMR 406(FIG. 4B). VMR 406 receives the descriptors 802 from RA block 404*b* of VEB 404. The multicast buffer resource accounting and LTL/RBH pruning have already been performed by LTL/RBH block 404*a* and RA block 404*b* of VEB 404 before descriptor 802 is passed to VMR 404. If a packet is dropped based on resource accounting or LTL/RBH accounting the descriptor is still sent to VMR 406 for reorder processing with the DROP field indicating the packet should be dropped. After the context and state machine are updated, VMR 404 drops the descriptor instead of sending it to a multicast reorder output queue (MROQ) if it is marked as drop in the DROP field. In the reorder processing VMR 404 maps the SFI field 804 to a line card (LC) value in SFI to LC Mapping Block 424. The LC value is used to index into the Multicast Reorder Context Memory (MRCM) 428 and index into the MR Timer Memory 432. The LC value is also used as a Queue Index for the MROQs. Each LC value is tagged to a specific line card. In the embodiment, only one of the IO-slices on a line card is allowed to perform dynamic multicast load balancing. Each reorder queue queues packets that use a rerouted path to its destination chosen based on the DHFV process. The packets cannot be sent out until the last packet from the original route is sent out first. The MR_STATE values stored in MR Context Memory 428 tracks the reorder flow for each context.

Referring now to FIG. 4C, therein is shown a reorder state machine in accordance with an embodiment of the disclosure. The reorder process may be described with reference to FIGS. 4B and 4C. The reorder process starts when a packet with the COLOR field 814 marked "new" is detected for a given line card and the reorder state machine for that line card is in IDLE at state 460. At 462 a context for the line card is created for the line card that includes the SFI, RBH, Sublink ID values and an MROQ indexed to the line card is activated. The TIMER VALUE and VLD (timer valid) states 430 are also set in the MR TIMER MEMORY 432(FIG. 4B) for the MROQ of line card at state 462 to run the reorder timer. The MR state then transitions to the ACTIVE state 464. The MR Context Memory 428 stores the fields of the descriptor 802 defining the context along with the MR_STATE as shown at 426 (FIG. 4B). Once the reorder state is ACTIVE at state 466 the reorder process separates the reordered traffic from the regular traffic based on the COLOR, RBH, SFI, and Sublink Fields. Rerouted packets (packets on a new route) are dequeued into the MROQ indexed by the line card ID. All other packets are enqueued at MROQ[0]. MROQ [0] is the only queue that feeds packet descriptors to VEQ 408. The MROQ structure stores part of the descriptor relevant to VEQ 408 that includes PSV, PRI, and the Packet Descriptor fields. MROQ[0] is dequeued whenever it holds one or more packets. The descriptor 836 configured as shown in FIG. 8 is sent to VEQ 408 for replication and queuing. If the drop flag was set in the descriptor 802, the descriptor is dropped after reorder processing and not queued in the MROQs.

If a packet descriptor marked "last" is received for the partial reorder context (SFI, RBH) that is in the ACTIVE state at 464, the reorder process moves to the REORDER state 467 and at 465 the associated MROQ is inserted at the tail of MROQ[0]. If the incoming packet is marked "new" but an SFI mismatch is detected in an ACTIVE state at 466, the MR state generates an error interrupt at 463. The error interrupt marks the condition of multiple active instances of dynamic multicast load balancing on the same line card. The newly rerouted flow is ignored and sent to MROQ[0]. The MR State machine only completes the reorder process when the 'last' packet is received or a time out is received for the original flow. The error interrupt condition may be used to flag an error interrupt to software to increase the TDM time slot interval that is used to trigger multicast load balancing at the ingress in order to prevent overlaps across I/O Slices on the same line card.

When the background timer scan module of 434 (FIG. 4B) detects a timeout condition at MR Timer Memory 432 it generates a timeout event at 466 from the ACTIVE state 464 to the reorder state 467. The timer may be used to bound the reorder interval for a given flow. At a timeout, the reordering of a given context is considered complete and the reorder queue MROQ for the context is inserted at the tail of MROQ [0]. MROQ[0] is dequeued until all the pending packet descriptors are sent to VEQ and the MROQ[0] is empty.

The MROQ may comprise a 32K deep array in the form of MR Queue Linked List 440 that holds packet descriptors. The queue memory may be 32K deep, which is the same number as the maximum number of packets that can be stored by the total multicast egress buffer 404c of VEB 404. The packet pointer also may act as a link pointer. In the example embodiment the MROQ supports 26+1 Queues, as shown by 26+1 Queue Head/Tail pointers block 442, with each queue of the 26 corresponding to a specific line card and the Queue ID 0 reserved as the regular output queue MROQ[0]. In alternative embodiments, any number of queues may be implemented. The packet descriptors are only dequeued from MROQ[0]. Queues MROQ[1-26] may be dedicated to LC[1] to LC[26]. Packets that need to be reordered are inserted into the reorder queues. At the end of the reordering process for a particular context, which may be triggered by receiving a packet marked "last" or a timeout, the reorder queue for the context may be inserted at the tail of MROQ[0] and the multicast descriptors sent to VEQ 408.

Referring now to FIGS. 5A-5F, therein are simplified flow diagrams illustrating example operations that may be associated with an egress section of a network in accordance with an embodiment of the disclosure. FIGS. 5A-5D shows an example embodiment of the reordering process, shown generally by reference numeral 500, in accordance with an embodiment of the disclosure. The process begins at 502 when a packet is received at the egress. At 504 it is determined if the packet has a color marking "new." If the packet is marked "new" the process moves to FIG. 5B. At 514 of FIG. 5B, the data packet marked "new" is stored in a reorder queue (MROQ) for its context (based on the SFI, and RBH in the descriptor associated with the data packet) If a reorder queue already exists for the context of the packet marked "new", the data packet is stored in the existing reorder queue for its context. If a reorder queue is not active for the context, a reorder queue is activated for the context and the data packet marked "new" is stored in the newly created reorder queue. At 516 it is determined if a reorder timer is running for the context. If an egress reorder timer is already running for the context the process moves back to 502 of FIG. 5A. If, however, a reorder timer is determined at 516 not to be running, a reorder queue was just created for the context and a reorder timer is started at 518. The process then moves back to 502 of FIG. 5A and continues.

Figure 5A:
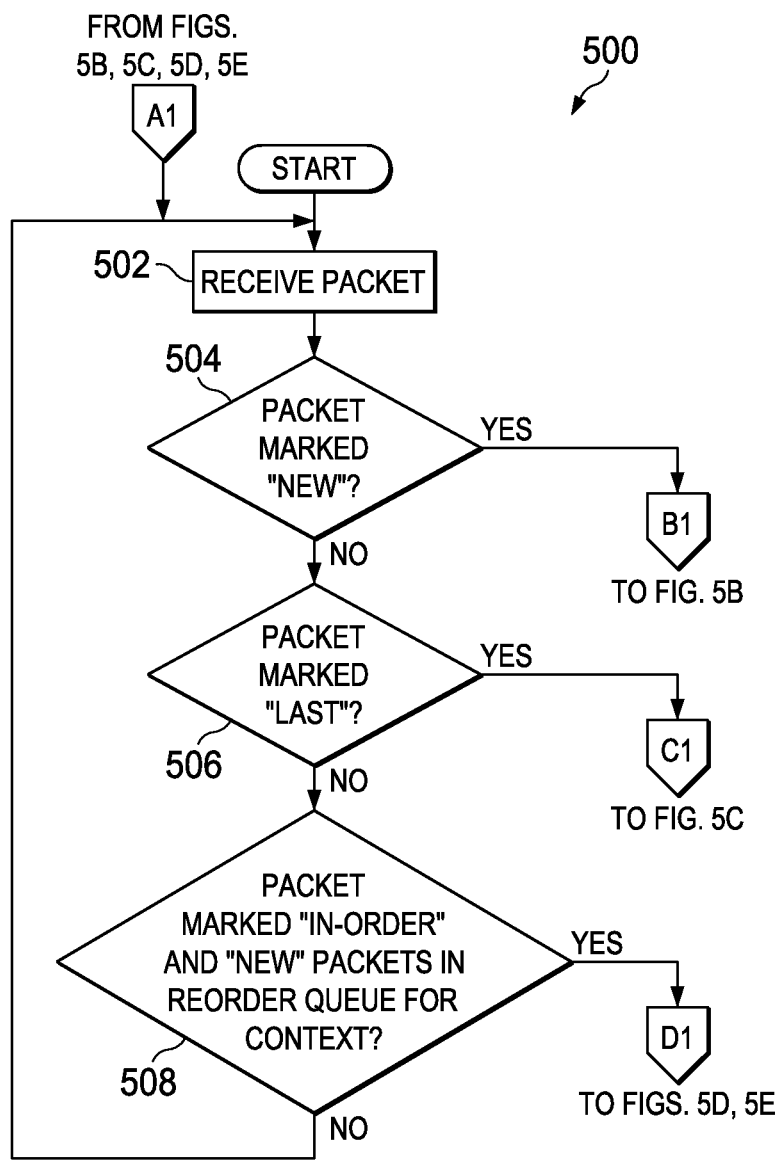

If, however, at 504 it is determined that received data packet is not marked "new" the process moves to 506 where it is determined if the data packet is marked "last." If the data packet is marked "last" the process moves to 526 of FIG. 5C. At 526 of FIG. 5C it is determined if there is a data packet marked "new" in a reorder queue for the context of the data packet marked "last." If there is not already a data packet marked "new" in a reorder queue for the context no reorder action is taken at 528 and the data packet is dequeue to the egress output queue. The process then moves back to 502 of FIG. 5A. If, however, there is a data packet marked "new" in a reorder queue for the context of the received data packet marked "last," the process moves to 530, where the data packet marked "last" is dequeued to the egress output queue. Next at 532 the data packets marked "new" in the reorder queue for the context are dequeued to the egress output queue in the order received and, at 534, the reorder state for the context is reset. The process returns to the process of FIG. 5A.

If, however, the data packet is determined at 506 of FIG. 5A not to be marked "last," the process moves to step 508. At 508 it is determined if the data packet is marked "in order" and if there are data packets marked "new" in an active reorder queue for the context of the data packet. If the data packet is marked "in order" and if there are not data packets marked "new" in a reorder queue for the context of the data packet the process moves to back to 502. If, However, the data packet is marked "in order" and if there are data packets marked "new" in a reorder queue for the context of the data packet the process moves to FIG. 5D. At 548 of FIG. 5D the Sublink_ID in the descriptor of the data packet is checked and at 550 it is determined if the Sublink_ID is a newly assigned sublink for the context of the data packet. If the data packet Sublink_ID does not belong to a newly assigned Sublink for the context of the data packet the data packet is dequeued to the output queue. The process then moves back to FIG. 5A. If the packet Sublink_ID belongs to a newly assigned Sublink, at 552 the reorder timer for the context (which would have been started because data packets marked "new" have been received) is reset and the Sublink_ID is marked. The process then returns to FIG. 5A.

Figure 5D:
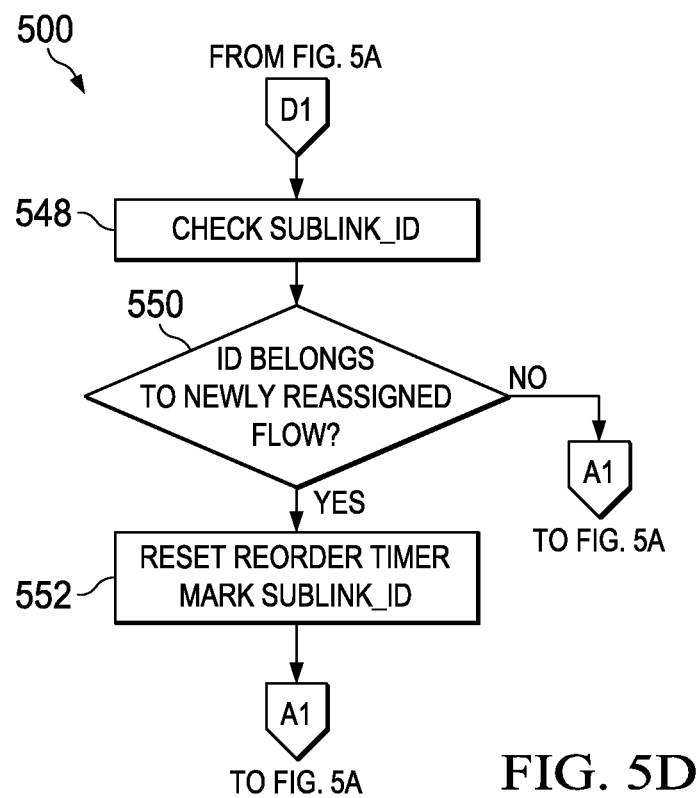
Figure 5E:
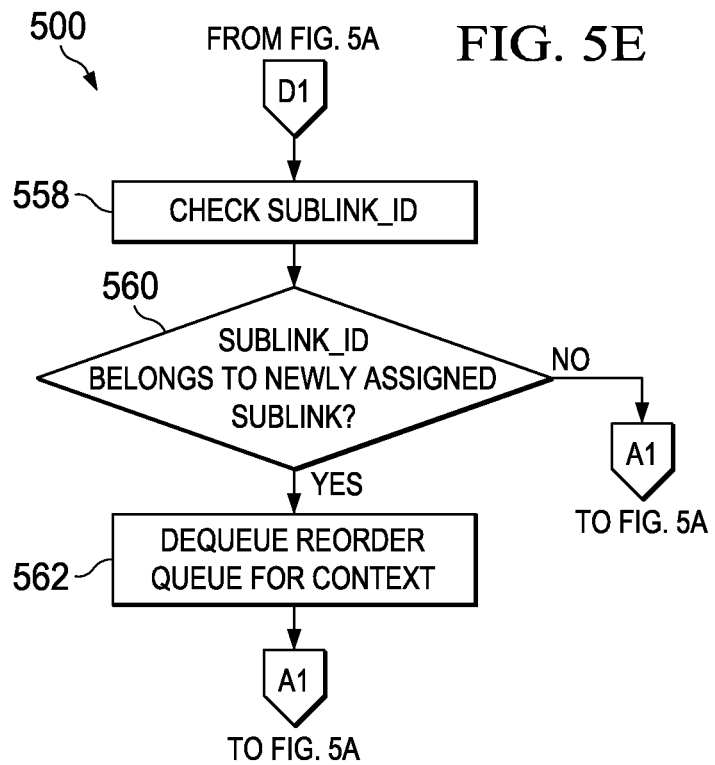
Figure 5F:
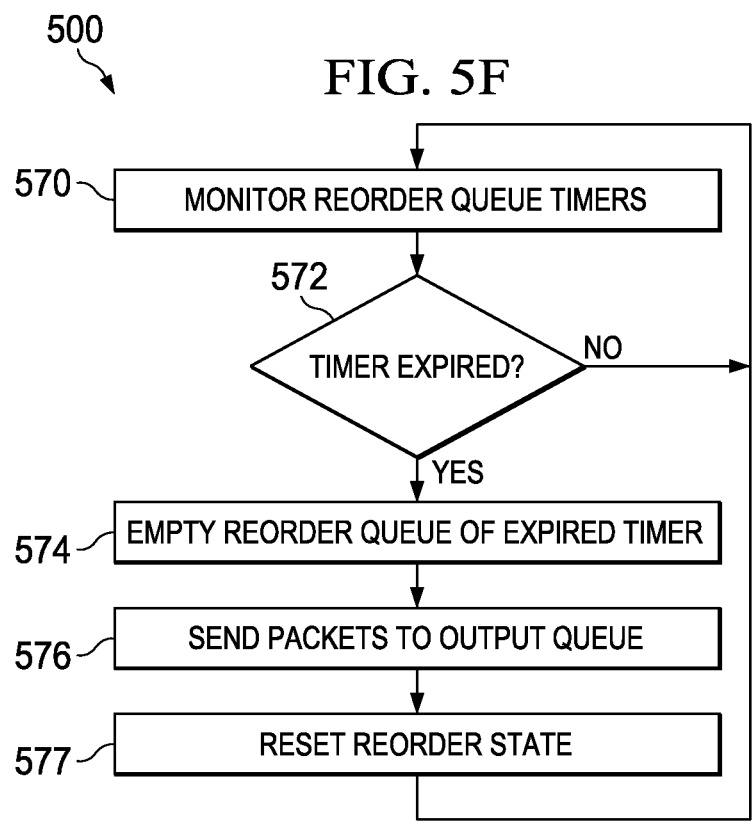

Referring now to FIG. 5F, therein is a simplified flow diagram showing reorder timer monitoring according to an embodiment of the disclosure. The process of FIG. 5F is a background process for monitoring reorder timers set at 518 of FIG. 5B. At 570 the reorder timers are monitored. At 570 and 572 the process continues to monitor the reorder timers as long as no reorder timer has expired. At 572 if it is determined a reorder timer has expired, the process moves to 574. At 574 the reorder queue of the context associated with the expired reorder timer is emptied and at 576 the packets from the order queue are dequeued and sent to the output and at 577 the reorder state for the context is reset to idle.

As an alternative embodiment, the process of the embodiment may move from 508 of FIG. 5A to 558 of FIG. 5E instead of moving to 548 of FIG. 5D. In this alternative, at 558 the Sublink_ID of the packet is checked and at 560 it is determined if the Sublink_ID is a newly assigned sublink for the context of the data packet. If the data packet Sublink_ID does not belong to a newly assigned Sublink for the context of the packet the packet is dequeued to the output queue and process moves back to 502 of FIG. 5A. If the packet Sublink_ID belongs to a newly assigned Sublink at 562, it is assumed that the packet marked "last" from the previously assigned Sublink_ID has been lost and the Reorder Queue for the data packet context is dequeued in the order the data packets were received and the reorder process for the context is reset to the idle state. The process then moves to FIGURE A. In this alternative the reorder process may end at 562 without a reorder timer expiring or a packet marked "last" for the context having been received.

Figure 6A:
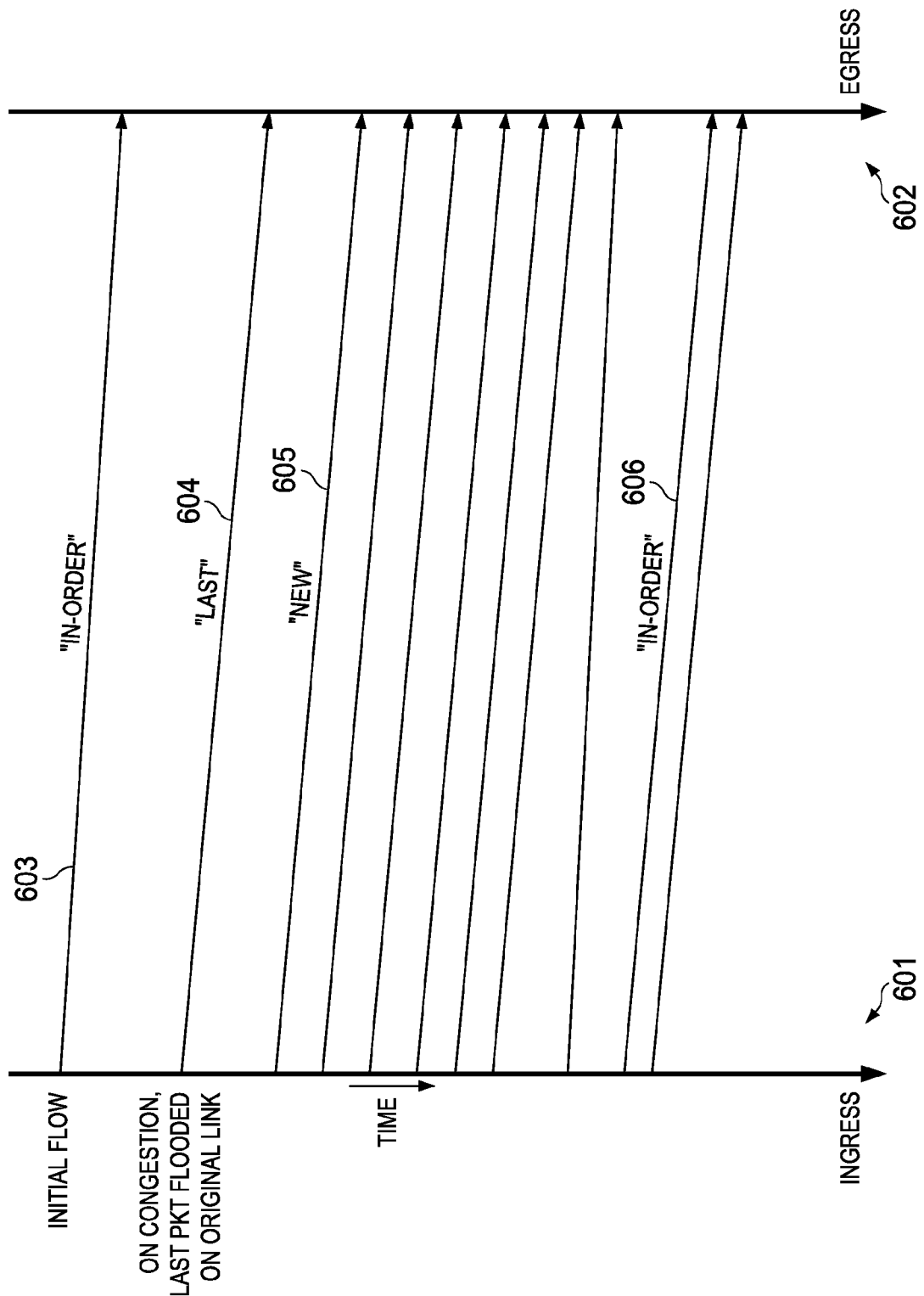
FIGS. 6A through 6C are simplified signal flow diagrams illustrating example signal flows that may be associated with an embodiment of the disclosure.
Figure 6B:
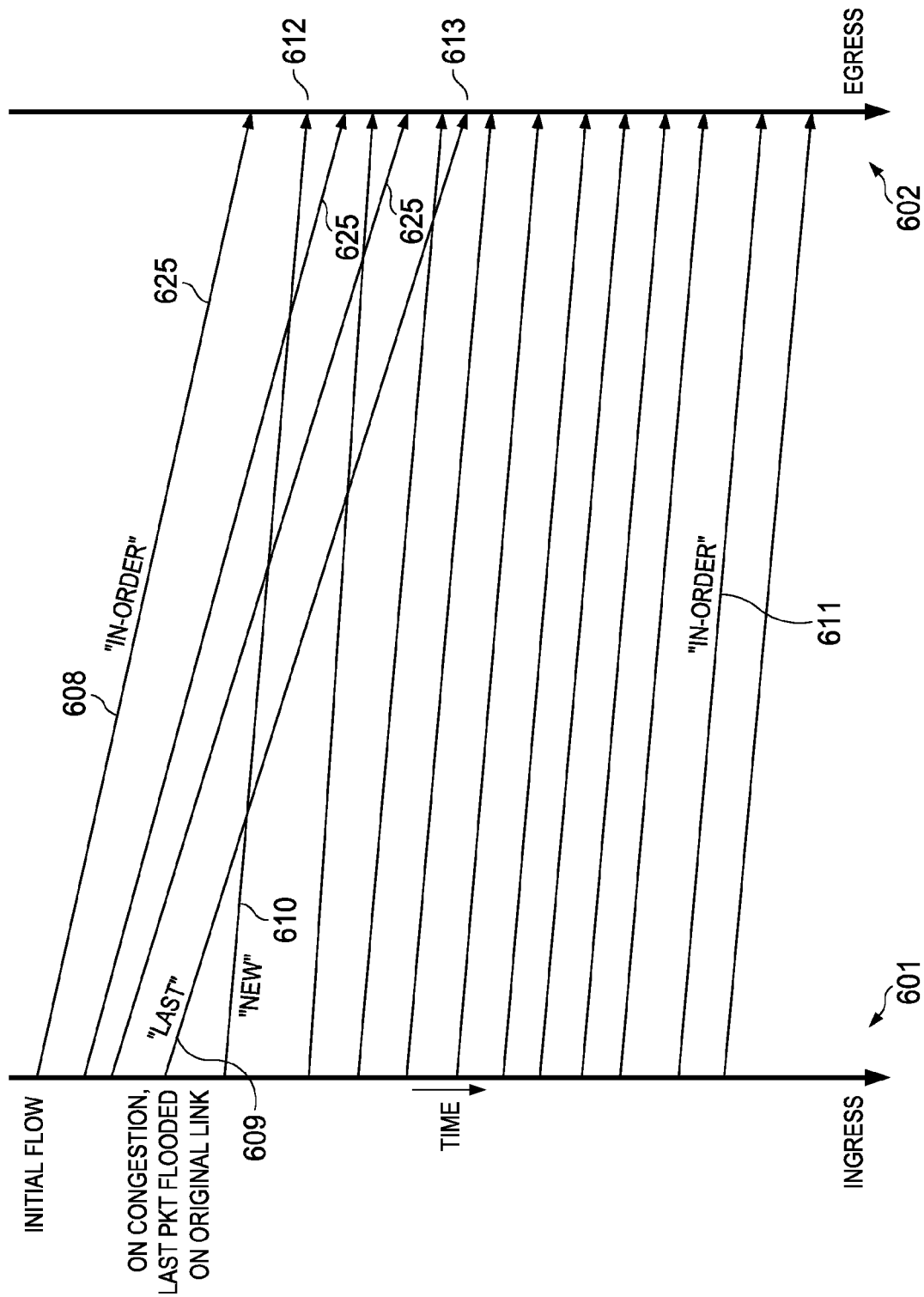
Figure 6C:
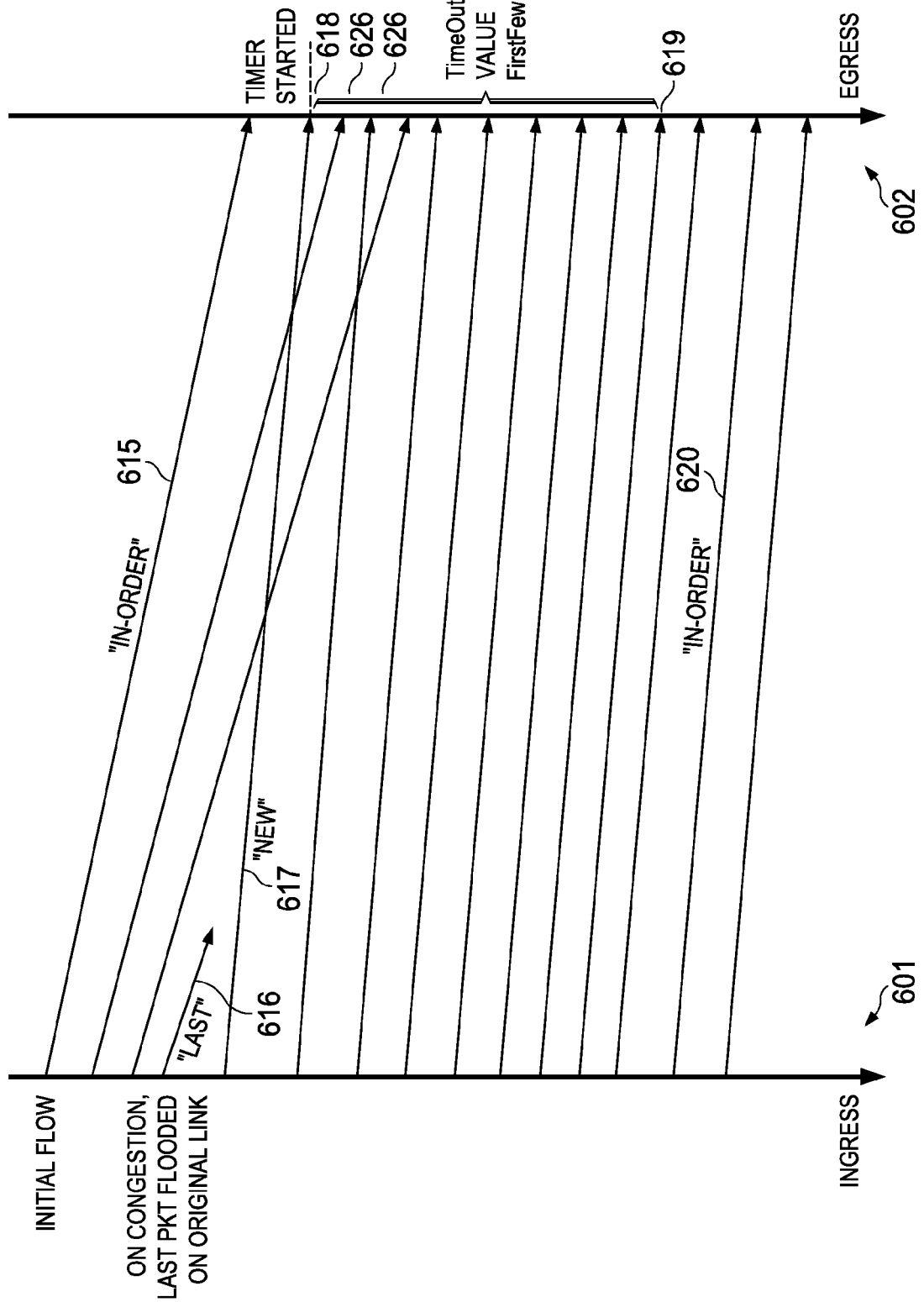

Referring now to FIGS. 6A-6C therein are simplified data packet flow diagrams illustrating example data packet flows that may be associated with an embodiment of the disclosure. FIGS. 6A-6C show data packet flows for transmission of data packets in a sequence with time moving in the vertical direction from top to bottom. FIG. 6A shows a RBH bin reassignment with no reordering at the Egress. In FIG. 6A an initial multicast flow of "in-order" packets 603 sent from the Ingress 601 is received at the Egress 602. With congestion the DHFV process in the Ingress 601 reassigns the multicast flow and the packet marked "last" on the original sublink is flooded to all destinations at 604. Beginning at 605 the first few packets marked "new" are sent on the newly assigned sublink to the Egress 602. The Ingress Reorder Timer expires and at 606 the packets on the newly assigned sublink are sent marked "in order." In FIG. 6A no reorder process is triggered at the Egress 602 because the reassigned multicast flow does not arrive out of order. FIG. 6B shows a regular reorder operation. In FIG. 6B an initial flow of "in order" data packets is sent from the Ingress 601 to Egress 602 at 608. The DHFV process reassigns the multicast flow and at 609 the last data packet on the original Sublink is flooded to all multicast flow destinations. At 610 data packets marked "new" are sent on the newly assigned link. At 612 data packets marked "new" are received at the Egress before the data packet marked "last" is received at 613. The packets marked "new" will then be queued in a reorder queue for the context of the data packets marked "new." Packets marked "in order" received at 625 have the same context and are dequeued to the output while the packets marked "new" are continued to be queued in the reorder queue until the packet marked "last" is received at 613. When the data packet marked "last" is received at 613 that data packet is dequeued and all the packets pending in the reorder queue are moved to the output queue in the order of arrival. The reorder state for the context is reset and subsequently received "new" and "in order" data packets are immediately dequeued to the output and not sent to the reorder queue. FIG. 6C shows a reorder operation when the data packet marked "last" is lost. In FIG. 6C an initial flow of "in order" data packets 615 is sent from Ingress 601 to Egress 602. The DHFV process reassigns the flow and at 616 the last data packet on the original Sublink is marked "last" and flooded to all destinations. At 617 packets marked "new" are sent on the newly assigned link. The Egress receives the frames marked "new" at 618, activates the reorder process, and starts the reorder timer for the context of the data packets marked "new." While the data packets marked "new" are being sent to the reorder queue, data packets marked "in order" having the Sublink ID used prior to reassignment of the relevant bin received at 626 are sent to the output queue. Upon expiration of the reorder timer at 619 the frames from the reorder queue are sent to the output queue while regular frame receive is put on hold. Once the queue is empty a regular frame receive operation is resume. The Egress reorder timer value may be predetermined to be sufficiently long so that in normal traffic flow several frames marked "in order" from the reassigned Sublink_ID are received at the Egress 602.

Figure 7A:
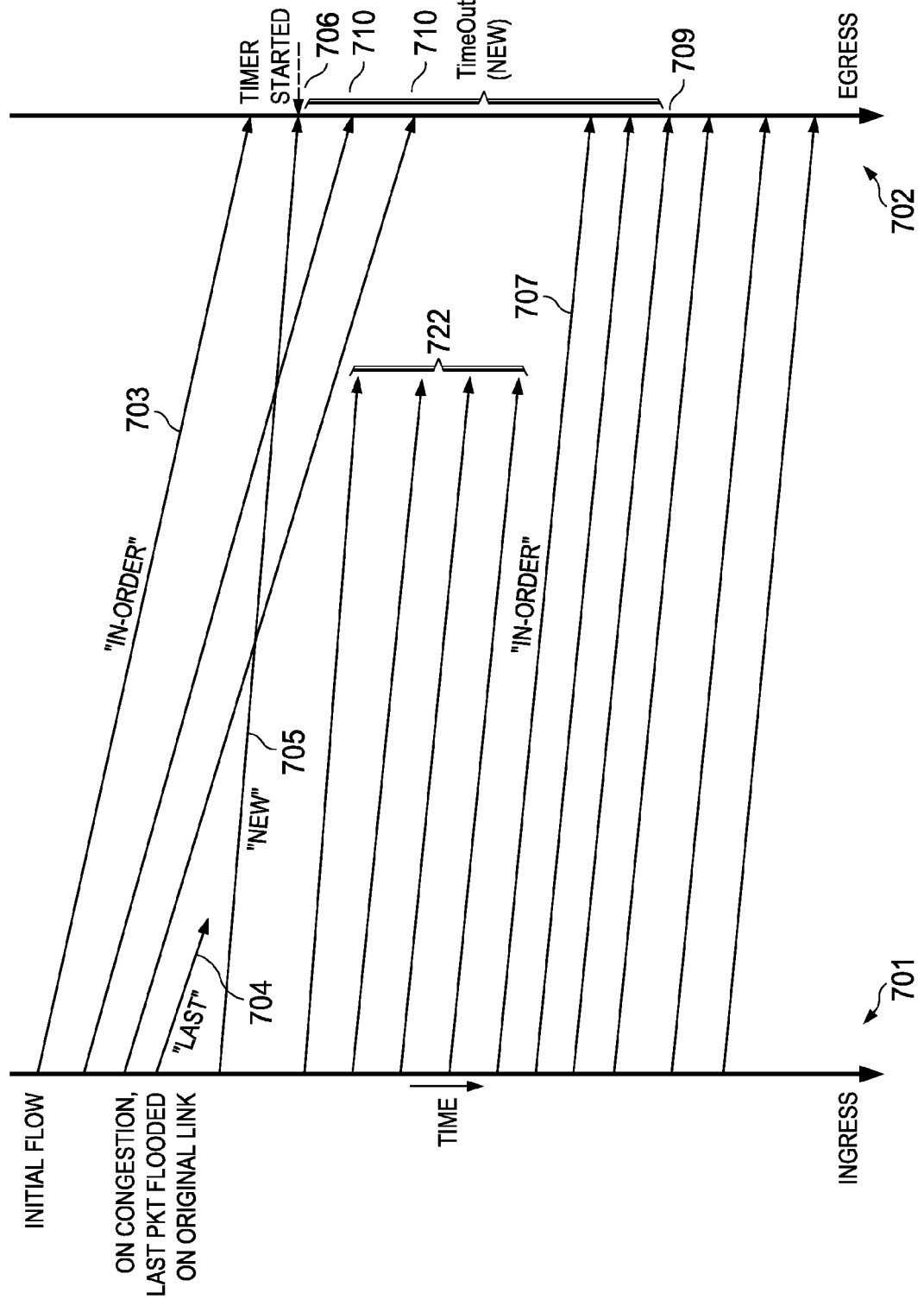
FIGS. 7A and 7B are simplified signal flow diagrams illustrating example signal flows that may be associated with an embodiment of the disclosure.
Figure 7B:
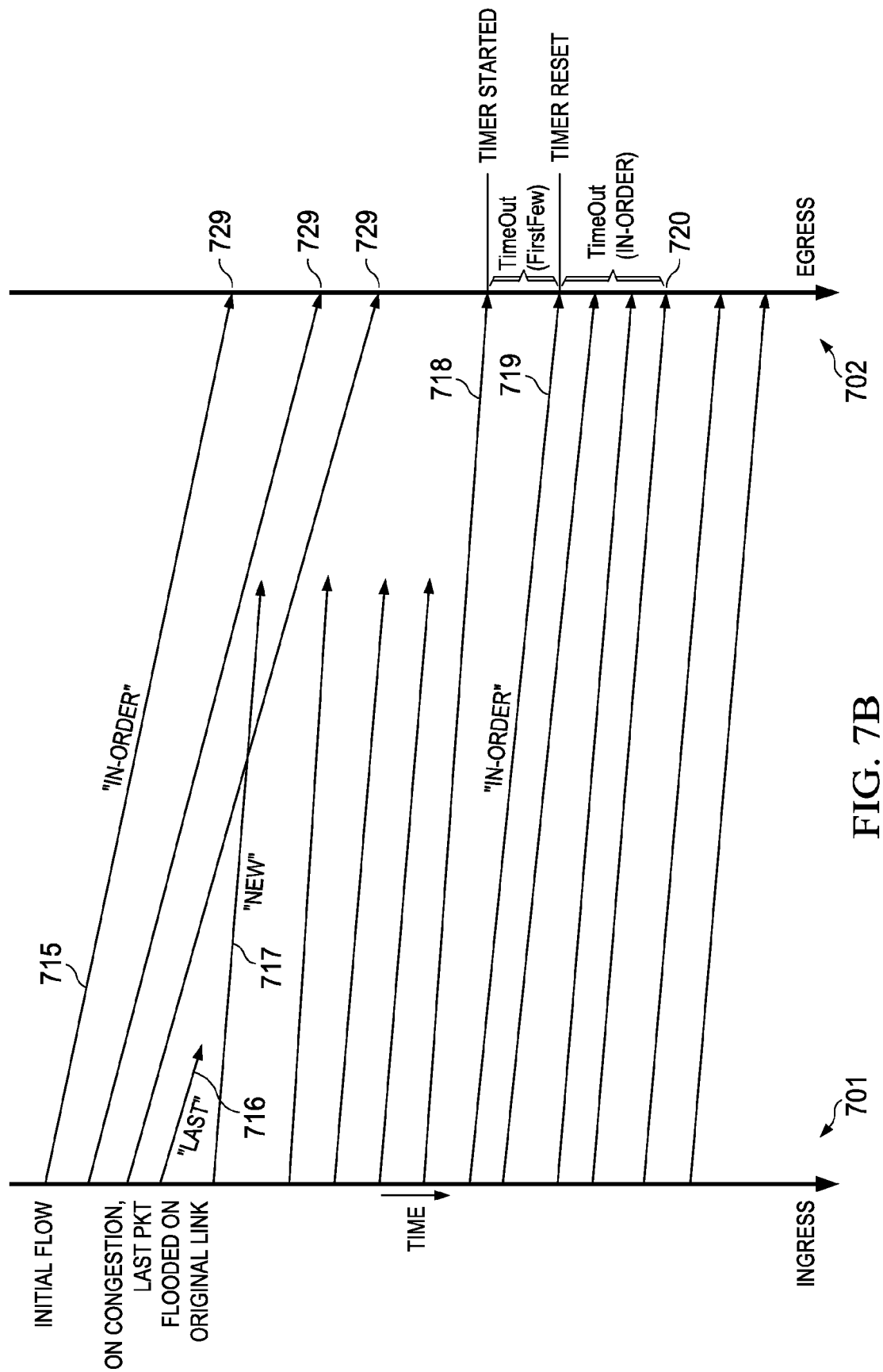

Referring now to FIGS. 7A and 7B, therein are simplified signal flow diagrams illustrating example signal flows that may be associated with an embodiment of the disclosure. FIG. 7A shows a reorder operation in which a data packet marked "last" and several frames marked "new" are lost. In FIG. 7A an initial flow of "in order" packets 703 is sent from Ingress 701 to Egress 702. The DHFV process reassigns the flow and at 704 the last packet on the original Sublink is marked "last" and flooded to all multicast flow destinations. At 705 packets marked "new" are sent on the newly assigned link. The Egress receives the initial data packet marked "new" at 706, activates the reorder process, and starts the reorder timer for the context of the flow. After the initially sent data packet marked "new" is received the other data packets marked "new" are lost at 722 and not received at the egress. The frames marked "in order" with the Sublink ID prior to reassignment that are received at 710 are sent to the output queue. Upon expiration of the reorder timer at 709 the frames from the reorder queue are sent to the output queue while regular frame receive is put on hold. Once the queue is empty a regular frame receive operation is resumed. The Egress reorder timer value may be predetermined to be sufficiently long so that in normal traffic flow several frames marked "in order" from the reassigned Sublink_ID are received at 707 at the Egress 702. Because the multicast frames can be dropped or delayed as shown in FIG. 7A due to congestion and various other conditions the Egress reorder timer value can be adjusted such that the recovery from the reordering state is bounded by a time value. FIG. 7B shows an example of multiple marked frame loss where there is a timeout update without out-of-order packets sent out. In FIG. 7B an initial flow of "in order" packets 715 is sent from Ingress 701 to Egress 702. The DHFV process reassigns the flow and at 716 the last packet on the original Sublink is marked "last" and flooded to all destinations. At 717 packets marked "new" are sent on the newly assigned link. Several of the packets marked "new" are lost but the Egress receives a data packet marked "new" at 718, activates the reorder process, and starts the reorder timer for the context of the data packet marked "new". Any frames marked "in order" with the Sublink ID prior to reassignment that are received at 729 at Egress 702 are sent to the output queue. After the first data packet marked "new" is received at 718 the data packet received at the egress at 719 is marked "in order" and is carried on the newly assigned sublink. This causes the Egress reorder timer to be reset to a shorter time period at 719. The Egress timer then expires at 720. Upon expiration of the Egress reorder timer at 720 the frames from the reorder queue are sent to the output queue while regular frame receive is put on hold. Once the queue is empty a regular frame receive operation is resume. The Egress reorder timer value may be predetermined to be sufficiently long so that in normal traffic flow several frames marked "in order" from the reassigned Sublink_ID are received at the Egress 702.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software (for example, provisioned in any network node). In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Note also that as used herein, the term "node" can include computers, network appliances, servers, routers, switches, gateways, bridges, load balancers, firewalls, processors, modules, or any other suitable device, component, network element, or object operable to exchange information in a network environment. Moreover, the nodes may include any suitable hardware, software, components, modules, interfaces, or objects that facilitate the operations thereof. This may be inclusive of appropriate algorithms and communication protocols that allow for the effective exchange of data or information.

Furthermore, the embodiments may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations described with reference to the preceding FIGURES illustrate only some of the possible scenarios that may be executed by, or within, the system. Some of these operations may be deleted or removed where appropriate, or may be changed, modified or changed considerably without departing from the scope of the discussed concepts. In addition, the timing of these operations relative to one another may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for multicast data traffic flow reordering, comprising:
   receiving a data packet at an egress of a node, the data packet associated with a descriptor including at least one parameter;
   determining the at least one parameter of the descriptor; and
   processing the data packet for the multicast data traffic flow reordering based on the determining of the at least one parameter of the descriptor.

2. The method of claim 1, wherein the descriptor includes a status indicating that the data packet comprises a last data packet of a data traffic flow sent on a first sublink, wherein the data traffic flow is reassigned to a second sublink.

3. The method of claim 1, wherein the descriptor includes a status indicating that the data packet comprises a new data packet of a data flow sent on a second sublink, wherein the data traffic flow is reassigned from a first sublink.

4. The method of claim 1, further comprising:
   reassigning the data flow from a first sublink to a second sublink of a plurality of sublinks;
   determining that the first data packet is a last data packet of the data flow sent on the first sublink; and
   sending the first data packet on the first sublink to the egress.

5. The method of claim 4, wherein marking a last data packet of the data traffic flow sent on the first sublink comprises starting an ingress reorder timer, and wherein predetermined criteria is met if the egress reorder timer has not expired.

6. The method of claim 1, further comprising:
   determining if there is at least one second data packet marked new and stored in a reorder queue;
   queuing the first data packet to an egress output queue;
   dequeuing the at least one second data packet marked new from the reorder queue; and
   resetting the reorder queue.

7. The method of claim 1, further comprising:
   determining that a particular data packet associated with a descriptor including a status of new is stored in a reorder queue;

determining if a first sublink ID is a sublink ID of a sublink to which a particular data flow for the particular data packet has been newly reassigned;

dequeuing a certain data packet from the reorder queue to an egress output queue; and inserting the certain data packet at an end of the egress output queue.

8. The method of claim 1, further comprising:

storing the data packet in a reorder queue associated with a context;

determining that the data packet is a first packet marked new in the reorder queue associated with the context; and starting a timer associated with the context to run for a predetermined time.

9. The method of claim 8, further comprising:

receiving a second data packet at an egress of a node, the second data packet associated with a second descriptor;

determining that the second descriptor includes a second status marked in-order;

determining if a second sublink ID is the same as a first sublink ID; and resetting a reorder timer for the context.

10. The method of claim 8, further comprising:

monitoring the timer associated with the context;

dequeuing data packets stored in the reorder queue to an egress output queue; and clearing the reorder queue associated with the context.

11. An apparatus for multicast data traffic flow reordering, comprising:

an interface configured to receive network traffic;

one or more processors, wherein the apparatus is configured for:

receiving a data packet at an egress of the apparatus, the data packet associated with a descriptor including at least one parameter;

determining the at least one parameter of the descriptor; and processing the data packet for the multicast data traffic flow reordering based on the determining of the at least one parameter of the descriptor.

12. The apparatus of claim 11, wherein the descriptor includes a status indicating that the data packet comprises a last data packet of a data traffic flow sent on a first sublink, wherein the data traffic flow is reassigned to a second sublink.

13. The apparatus of claim 11, wherein the descriptor includes a status indicating that the data packet comprises a new data packet of a data flow sent on a second sublink, wherein the data traffic flow is reassigned from a first sublink.

14. The apparatus of claim 11, wherein the apparatus is further configured for:

reassigning the data flow from a first sublink to a second sublink of a plurality of sublinks;

determining that the first data packet is a last data packet of the data flow sent on the first sublink; and sending the first data packet on the first sublink to the egress.

15. The apparatus of claim 14, wherein marking a last data packet of the data traffic flow sent on the first sublink comprises starting an ingress reorder timer, and wherein predetermined criteria is met if the egress reorder timer has not expired.

16. The apparatus of claim 11, wherein the apparatus is further configured for:

determining if there is at least one second data packet marked new and stored in a reorder queue;

queuing the first data packet to an egress output queue;

dequeuing the at least one second data packet marked new from the reorder queue; and resetting the reorder queue.

17. The apparatus of claim 11, wherein the apparatus is further configured for:

determining that a particular data packet associated with a descriptor including a status of new is stored in a reorder queue;

determining if a first sublink ID is a sublink ID of a sublink to which a particular data flow for the particular data packet has been newly reassigned;

dequeuing a certain data packet from the reorder queue to an egress output queue; and inserting the certain data packet at an end of the egress output queue.

18. The apparatus of claim 11, wherein the apparatus is further configured for:

storing the data packet in a reorder queue associated with a context;

determining that the data packet is a first packet marked new in the reorder queue associated with the context; and starting a timer associated with the context to run for a predetermined time.

19. A non-transitory computer readable medium comprising instructions that, when executed, cause an apparatus to:

receive a data packet at an egress of a node, the data packet associated with a descriptor including at least one parameter;

determine the at least one parameter of the descriptor; and process the data packet for the multicast data traffic flow reordering based on the determining of the at least one parameter of the descriptor.

20. The medium of claim 19, wherein the descriptor includes a status indicating that the data packet comprises a last data packet of a data traffic flow sent on a first sublink, wherein the data traffic flow is reassigned to a second sublink.

* * * * *